United States Patent
Kato

(10) Patent No.: US 9,141,939 B2
(45) Date of Patent: Sep. 22, 2015

(54) IMAGE PROCESSING SYSTEM, IMAGE PROCESSING APPARATUS, DOCUMENT MANAGEMENT SERVER, CONTROL METHOD AND STORAGE MEDIUM THEREOF

(71) Applicant: CANON KABUSHIKI KAISHA, Tokyo (JP)

(72) Inventor: Natsuki Kato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/105,362

(22) Filed: Dec. 13, 2013

(65) Prior Publication Data

US 2014/0176993 A1    Jun. 26, 2014

(30) Foreign Application Priority Data

Dec. 26, 2012  (JP) ................................ 2012-283668

(51) Int. Cl.
| | |
|---|---|
| *G06F 15/00* | (2006.01) |
| *G06Q 10/10* | (2012.01) |
| *H04N 1/00* | (2006.01) |
| *H04N 1/32* | (2006.01) |

(52) U.S. Cl.
CPC ........... *G06Q 10/10* (2013.01); *H04N 1/00244* (2013.01); *H04N 1/32101* (2013.01); *H04N 2201/0094* (2013.01); *H04N 2201/3209* (2013.01); *H04N 2201/3214* (2013.01); *H04N 2201/3215* (2013.01); *H04N 2201/3216* (2013.01); *H04N 2201/3221* (2013.01); *H04N 2201/3274* (2013.01)

(58) Field of Classification Search
USPC ........................................................ 358/1.15
See application file for complete search history.

(56) References Cited

U.S. PATENT DOCUMENTS

2010/0060922 A1* 3/2010 Teranoshita ................. 358/1.13

FOREIGN PATENT DOCUMENTS

| JP | 10-254745 | 9/1998 |
|---|---|---|
| JP | 2008-160531 | 7/2008 |

* cited by examiner

*Primary Examiner* — Saeid Ebrahimi Dehkord
(74) *Attorney, Agent, or Firm* — Fitzpatrick, Cella, Harper & Scinto

(57) ABSTRACT

The present image processing apparatus externally receives document data, obtains attribute information that indicates information on matters from a matter management server, and transmits the received document data and the obtained attribute information on individual matter data to a document management server. The document management server presents, in accordance with a request from an external apparatus, the transmitted document data and attribute information on matters to the external apparatus, and receives, from the external apparatus, association information that is selected in accordance with the presented information and associates the document data with the matter data, and registers, together with the association information, the corresponding document data in the matter management server.

18 Claims, 9 Drawing Sheets

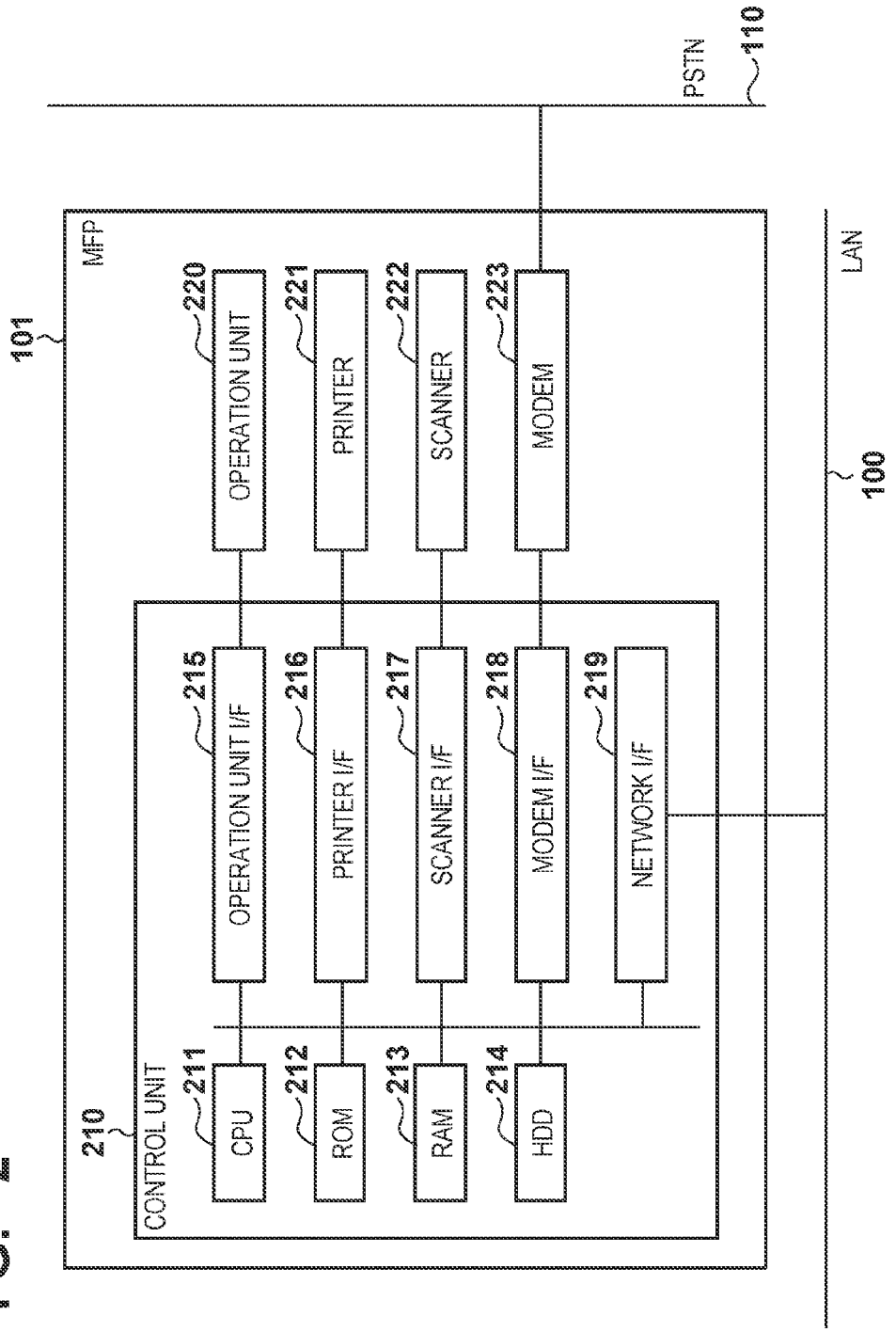

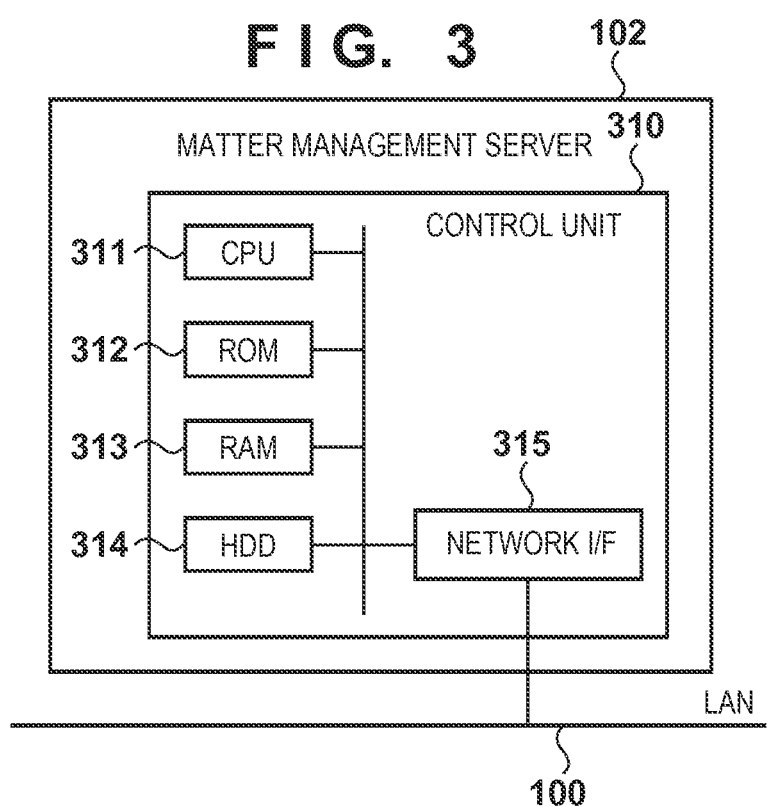
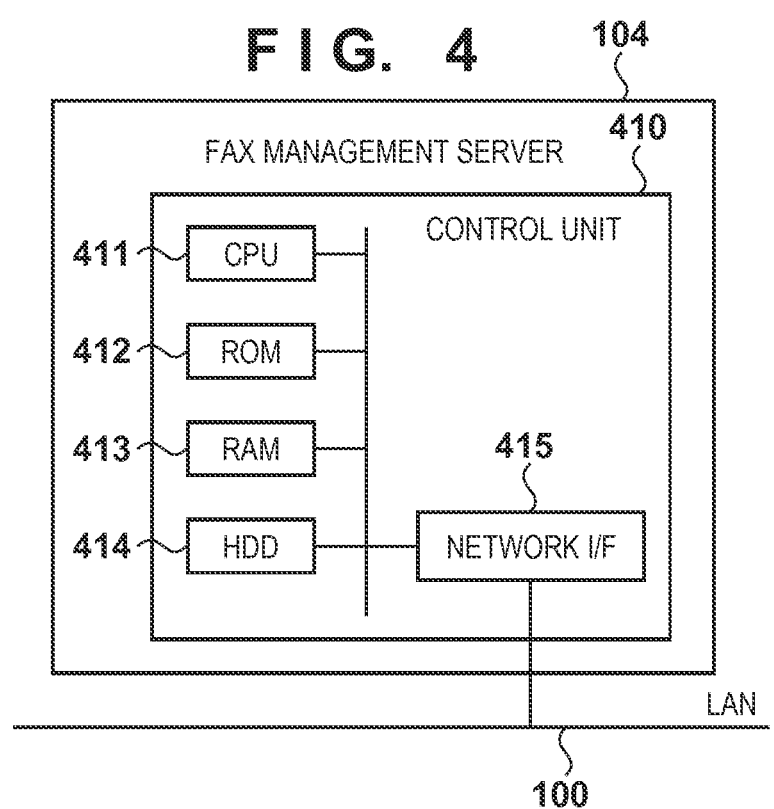

FIG. 5

| RECEPTION ID 501 | STORAGE LOCATION 502 | RECEPTION DATE AND TIME 503 | SHEET COUNT 504 | TRANSMISSION SOURCE NUMBER 505 |
|---|---|---|---|---|
| 0101 | Server_0101 | 2012/03/01 12:30:10 | 3 | 03-1111-1111 |
| 0102 | Server_0102 | 2012/03/01 15:00:00 | 5 | 03-1111-2222 |
| 0103 | Server_0103 | 2012/03/01 17:30:20 | 3 | 03-1111-1111 |

FIG. 6

| MATTER ID 601 | MATTER NAME 602 | CLIENT NAME 603 | TELEPHONE NUMBER 604 | PERSON IN CHARGE 605 |
|---|---|---|---|---|
| 0201 | CONTRACT WITH COMPANY A | COMPANY C | 03-1111-1111 | User A |
| 0202 | CONTRACT WITH COMPANY B | COMPANY C | 03-1111-1111 | User B |
| 0203 | LAWSUIT | COMPANY D | 03-1111-3333 | User C |
| 0204 | CONTRACT WITH COMPANY E | COMPANY C | 03-1111-1111 | User A |

FIG. 7

FIG. 8                                800

WEB BROWSER <FAX RECEPTION DOCUMENT LIST>

| | RECEPTION DATE AND TIME | SHEET COUNT | TRANSMISSION SOURCE NUMBER |
|---|---|---|---|
| ☐ | 2012/03/01 12:30:10 | 3 | 03-1111-1111 |
| ☐ | 2012/03/01 15:00:00 | 5 | 03-1111-2222 |
| ☐ | 2012/03/01 17:30:20 | 3 | 03-1111-1111 |

DELETE  UPDATE
 801     802

FIG. 9                                900

WEB BROWSER <FAX RECEPTION DOCUMENT CONFIRMATION>

■ MATTER NAME   [CONTRACT WITH COMPANY A ▼]
                                901
■ DOCUMENT NAME
   [20121001123000_0311111111]
                                902

903 — (preview area)

904 — ≪ < > ≫

REGISTER   DELETE   PRINT
  905       906      907

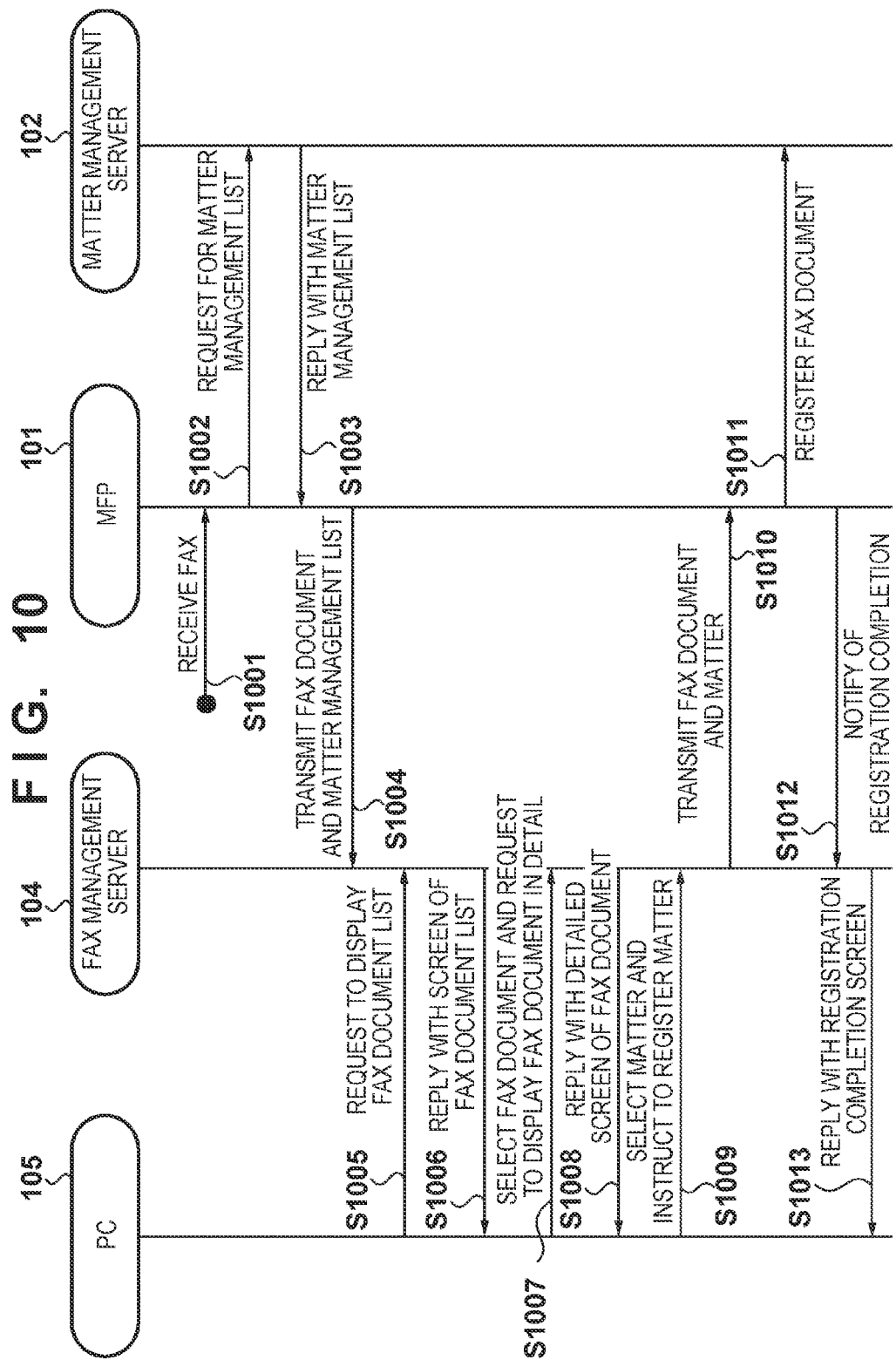

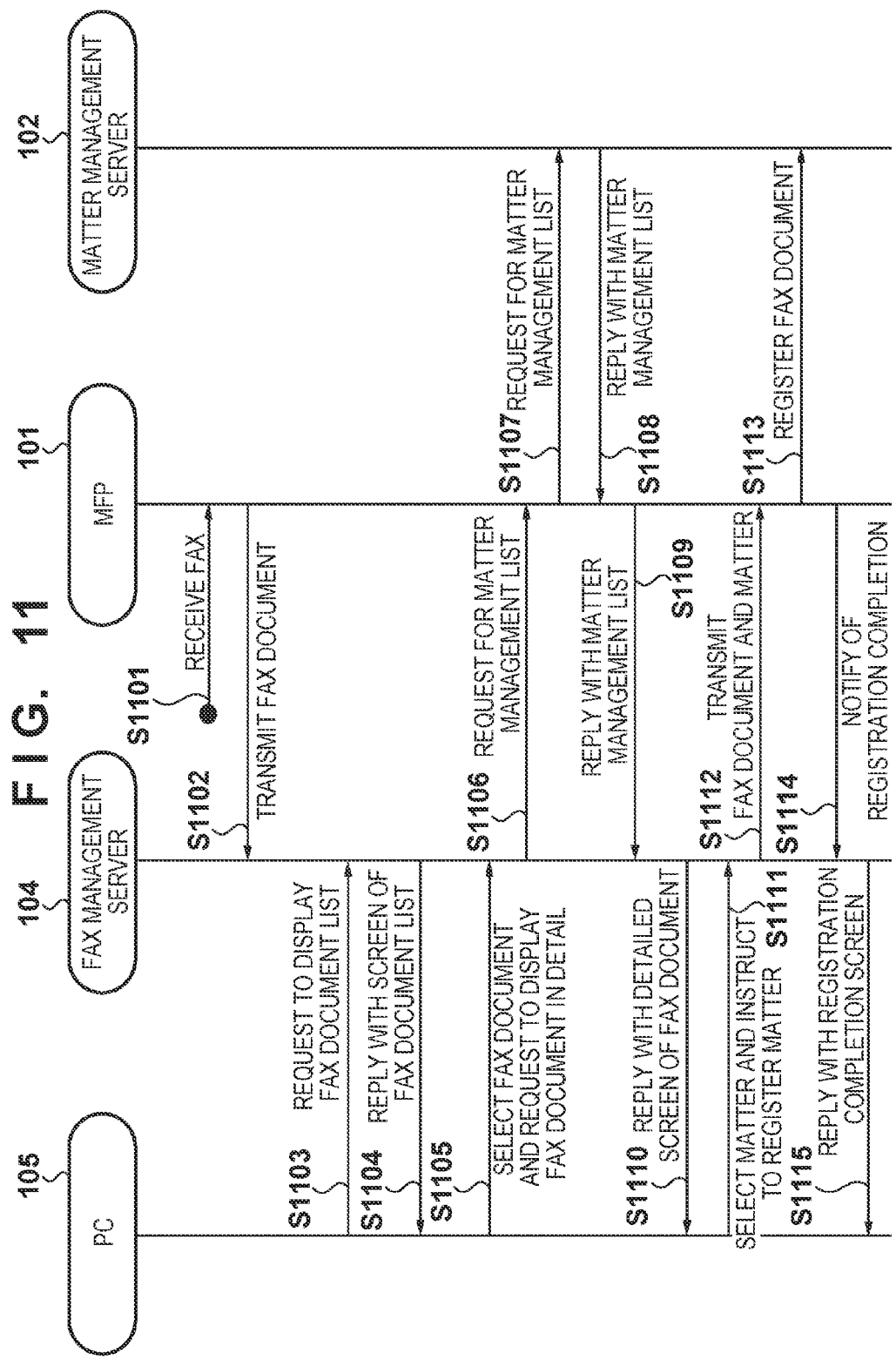

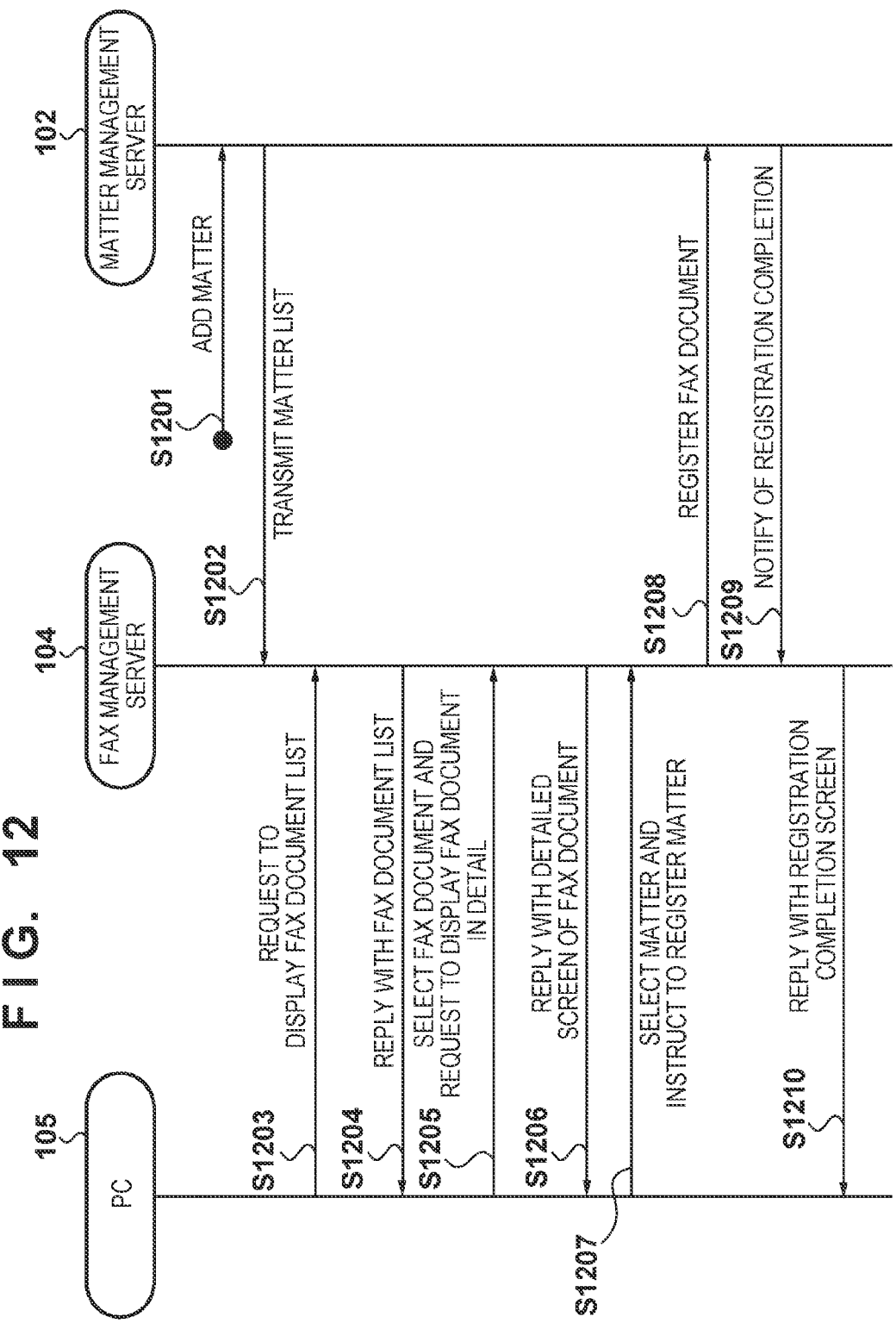

IMAGE PROCESSING SYSTEM, IMAGE PROCESSING APPARATUS, DOCUMENT MANAGEMENT SERVER, CONTROL METHOD AND STORAGE MEDIUM THEREOF

BACKGROUND OF THE INVENTION

1. Field of the Invention

The present invention relates to an image processing system that registers document data received by facsimile in a matter management server, an image processing apparatus, a document management server, control methods and storage medium thereof.

2. Description of the Related Art

In patent attorney offices, law offices (hereinafter, referred to as "offices"), and the like, fax documents received from clients, law courts, and the like are managed for individual matter data. Here, the fax documents are registered as image data, together with matter data, in a matter management server, in order to easily be referenced by lawyers and staff (hereinafter, referred to as "user"). A system for registering a fax document in a management server is widely known, and an attempt has also been made to improve efficiency in document search and management by registering image data of the document, together with attribute information on the document.

Japanese Patent Laid-Open No. 10-254745 discloses that, when document data is registered, attribute information is registered by being selected from among attribute information choices held in a management server, instead of being manually input. Also, Japanese Patent Laid-Open No. 2008-160531 discloses a system in which a user is notified of fax reception of document data, and gives an instruction to perform processing on the document data. With this, even if, for example, the user is not near an apparatus that has received a fax document, the user can give an instruction to register the fax document in a matter management server.

However, the above-described conventional technologies have the following problem. This problem occurs, for example, in the case where the matter management server is formulated within a local area network of an office. If a user who is outside of a local area network (e.g., a place where he or she has gone to) is notified of reception of a fax document and performs registration of the fax document, there is likely to be a firewall between the user and the matter management server in view of office security. In this case, the user cannot access the matter management server to obtain attribute information choices (for example, matter information or the like) that are held by the matter management server. Further, since the user cannot access the matter management server also to register the document data, the user has to go back to the office in order to register the received document data in the matter management server.

SUMMARY OF THE INVENTION

The present invention enables realization of a system in which, even if a user cannot directly access a matter management server, attribute information on document data is selected and the selected attribute information is registered in the matter management server.

One aspect of the present invention provides an image processing system comprising: an image processing apparatus; a document management server that manages document data received by the image processing apparatus; and a matter management server that manages the document data and a matter in association with each other, the image processing apparatus including: a reception unit configured to externally receive document data; an obtainment unit configured to obtain attribute information that indicates information on matters from the matter management server; and a transmission unit configured to transmit, to the document management server, the document data received by the reception unit and the attribute information on individual matter data that was obtained by the obtainment unit, the document management server including: a presenting unit configured to present, in accordance with a request from an external apparatus, the document data transmitted by the transmission unit and the attribute information on matters that was transmitted by the transmission unit, to the external apparatus; and a registration unit configured to receive, from the external apparatus, association information that is selected in accordance with the information presented by the presenting unit and associates the document data with the matter data, and to register, together with the association information, the corresponding document data in the matter management server via the image processing apparatus.

Another aspect of the present invention provides an image processing system comprising: an image processing apparatus; a document management server that manages document data received by the image processing apparatus; and a matter management server that manages the document data and matter data in association with each other, the image processing apparatus including: a reception unit configured to externally receive document data; and a transmission unit configured to transmit the document data received by the reception unit to the document management server, the document management server including: an obtainment unit configured to obtain attribute information that indicates information on matters from the matter management server; a presenting unit configured to present, in accordance with a request from an external apparatus, the document data transmitted by the transmission unit and the attribute information on individual matter data that was obtained by the obtainment unit, to the external apparatus; a registration unit configured to receive, from the external apparatus, association information that is selected in accordance with the information presented by the presenting unit and associates the document data with the matter data, and to register, together with the association information, the corresponding document data in the matter management server.

Still another aspect of the present invention provides an image processing apparatus that is capable of communicating with a document management server that manages document data, and with a matter management server that manages the document data and matter data in association with each other, the image processing apparatus comprising: a reception unit configured to externally receive document data; an obtainment unit configured to obtain attribute information that indicates information on matters from the matter management server; a transmission unit configured to transmit the document data received by the reception unit and the attribute information on individual matter data that was obtained by the obtainment unit to the document management server, wherein, in accordance with an input of a user from an external apparatus, the document data and given matter data are associated with each other in the document management server, and are registered in the matter management server.

Yet still another aspect of the present invention provides a document management server that is capable of communicating with an image processing apparatus that receives document data, and with a matter management server that manages the document data and matter data in association with each other, the document management server comprising: a presenting unit configured to present, in accordance with a request from an external apparatus, the document data transmitted from the image processing apparatus and attribute information on matters transmitted from the image processing apparatus, to the external apparatus; and a registration unit configured to receive, from the external apparatus, association information that is selected in accordance with the information presented by the presenting unit and associates the document data with the matter data, and to register, together with the association information, the corresponding document data in the matter management server via the image processing apparatus.

Still yet another aspect of the present invention provides a document management server that is capable of communicating with an image processing apparatus that receives document data, and with a matter management server that manages the document data and matter data in association with each other, the document management server comprising: an obtainment unit configured to obtain attribute information that indicates information on matters from the matter management server; a presenting unit configured to present, in accordance with a request from an external apparatus, the document data transmitted from the image processing apparatus and the attribute information on individual matter data that was obtained by the obtainment, to the external apparatus; and a registration unit configured to receive, from the external apparatus, association information that is selected in accordance with the information presented by the presenting unit and associates the document data with the matter data, and to register, together with the association information, the corresponding document data in the matter management server.

Yet still another aspect of the present invention provides a control method of an image processing system that includes: an image processing apparatus; a document management server that manages document data received by the image processing apparatus; and an matter management server that manages the document data and matter data in association with each other, the method comprising: in the image processing apparatus, externally receiving document data; obtaining attribute information that indicates information on matters from the matter management server; and transmitting, to the document management server, the document data received in the receiving step, and the attribute information on individual matter data that was obtained in the obtaining step, and in the document management server, presenting, in accordance with a request from an external apparatus, the document data transmitted in the transmitting step, and the attribute information on matters that was transmitted in the transmitting step, to the external apparatus; and receiving, from the external apparatus, association information that is selected in accordance with the information presented in the presenting step and associates the document data with the matter data, and registering, together with the association information, the corresponding document data in the matter management server via the image processing apparatus.

Still yet another aspect of the present invention provides a control method of an image processing system that includes: an image processing apparatus; a document management server that manages document data received by the image processing apparatus; and an matter management server that manages the document data and matter data in association with each other, the method comprising: in the image processing apparatus, externally receiving document data; and transmitting, to the document management server, the document data received in the receiving step, and in the document management server, obtaining attribute information that indicates information on matters from the matter management server; presenting, in accordance with a request from an external apparatus, the document data transmitted in the transmitting step, and the attribute information on individual matter data that was obtained in the obtaining step, to the external apparatus; and receiving, from the external apparatus, association information that is selected in accordance with the information presented in the presenting step and associates the document data with the matter data, and registering, together with the association information, the corresponding document data in the matter management server.

Yet still another aspect of the present invention provides a control method of an image processing apparatus that is capable of communicating with a document management server that manages document data, and with a matter management server that manages the document data and matter data in association with each other, the method comprising: externally receiving document data; obtaining attribute information that indicates information on matters from the matter management server; and transmitting, to the document management server, the document data received in the receiving step, and the attribute information on individual matter data that was obtained in the obtaining step, wherein, in accordance with an input of a user from an external apparatus, the document data and given matter data are associated with each other in the document management server, and are registered in the matter management server.

Still yet another aspect of the present invention provides a control method of a document management server that is capable of communicating with an image processing apparatus that receives document data, and with a matter management server that manages the document data and matter data in association with each other, the method comprising: presenting, in accordance with a request from an external apparatus, the document data transmitted from the image processing apparatus and attribute information on matters transmitted from the image processing apparatus, to the external apparatus; and receiving, from the external apparatus, association information that is selected in accordance with the information presented in the presenting step and associates the document data with the matter data, and registering, together with the association information, the corresponding document data in the matter management server via the image processing apparatus.

Yet still another aspect of the present invention provides a control method of a document management server that is capable of communicating with an image processing apparatus that receives document data, and with a matter management server that manages the document data and matter data in association with each other, the method comprising: obtaining attribute information that indicates information on matters from the matter management server; presenting, in accordance with a request from an external apparatus, the document data transmitted from the image processing apparatus and the attribute information on individual matter data that was obtained in the obtaining step, to the external apparatus; and receiving, from the external apparatus, association information that is selected in accordance with the information presented in the presenting step and associates the document data with the matter data, and registering, together with the association information, the corresponding document data in the matter management server.

Still yet another aspect of the present invention provides a non-transitory computer-readable storage medium storing a computer program for causing a computer to execute the steps of the control method of the image processing system.

Yet still another aspect of the present invention provides a non-transitory computer-readable storage medium storing a computer program for causing a computer to execute the steps of the control method of an image processing apparatus.

Still yet another aspect of the present invention provides a non-transitory computer-readable storage medium storing a computer program for causing a computer to execute the steps of the control method of a document management server.

Further features of the present invention will be apparent from the following description of exemplary embodiments with reference to the attached drawings.

BRIEF DESCRIPTION OF THE DRAWINGS

FIG. 2 is a block diagram illustrating a configuration of an MFP 101 according to the first embodiment.

FIG. 3 is a block diagram illustrating a configuration of a matter management server 102 according to the first embodiment.

FIG. 4 is a block diagram illustrating a configuration of a fax management server 104 according to the first embodiment.

FIG. 5 is a diagram illustrating a fax reception management list 500 according to the first embodiment.

FIG. 6 is a diagram illustrating a matter management list 600 according to the first embodiment.

FIG. 7 is a diagram illustrating a document management lists 700 and 710 according to the first embodiment.

FIG. 8 is a diagram illustrating an operation screen of a PC 105 according to the first embodiment.

FIG. 9 is a diagram illustrating an operation screen of the PC 105 according to the first embodiment.

FIG. 10 is a sequence diagram illustrating an overall operation of the image processing system according to the first embodiment.

FIG. 11 is a sequence diagram illustrating an overall operation of an image processing system according to a second embodiment.

FIG. 12 is a sequence diagram illustrating an overall operation of an image processing system according to a third embodiment.

DESCRIPTION OF THE EMBODIMENTS

Figure 1:
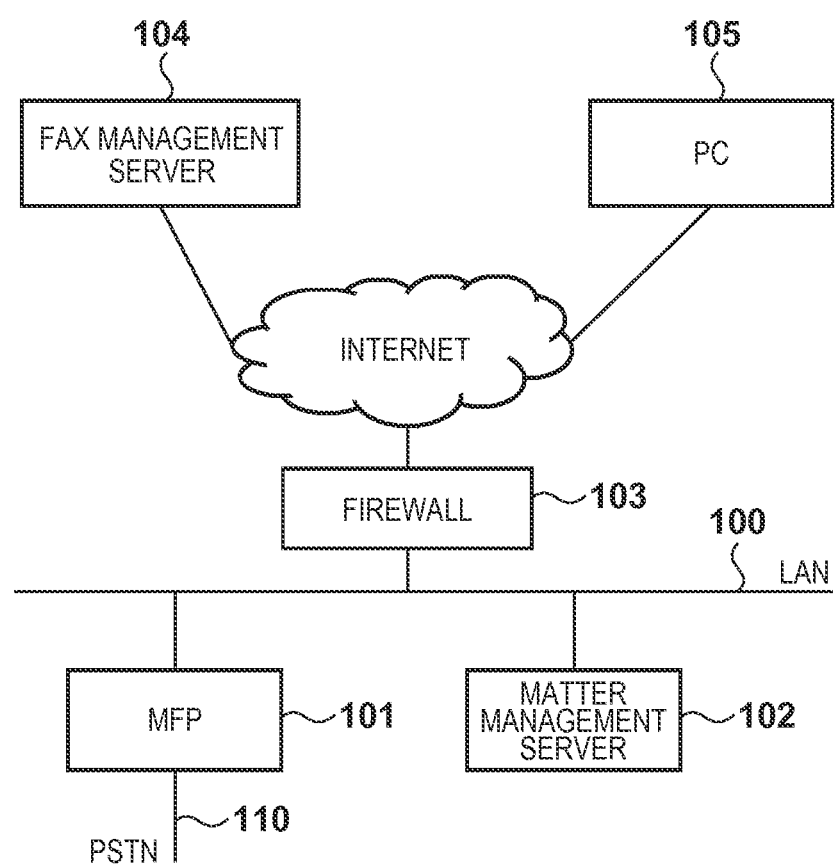
FIG. 1 is an overall view illustrating an image processing system according to a first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A Configuration of an Image Processing System

Hereinafter, a first embodiment of the present invention will be described with reference to FIGS. 1 to 10. First, an overall configuration of an image processing system will be described with reference to FIG. 1. A multifunction peripheral (MFP) 101 and a matter management server 102 are connected to a local area network (LAN) 100 so as to be communicable with each other. Also, the LAN 100 is capable of communicating with the Internet via a firewall 103. A fax management server 104 is available on the Internet. A user can access the fax management server 104 using a PC 105. An MFP 101 is an example of the image processing apparatus. The fax management server 104 is an example of the document management server. Also, the fax management server 104 is assumed to have a function as a web server for providing web services, but a separate web server that a user accesses may be provided. The PC 105 is an example of the information processing apparatus.

The MFP 101 is also connected to a public switched telephone network (PSTN) 110, and can perform fax transmission and reception to and from a facsimile apparatus (fax apparatus) (not shown). The PC 105 includes a web browser. Accordingly, the web browser of the PC 105 can display a screen based on HTML and JavaScript (registered trademark) that are provided by the web server of the fax management server 104, and operation instructions with respect to the fax management server 104 can be received from the user of the PC 105.

Although FIG. 1 shows an example in which the PC 105 is directly connected to the Internet, the PC 105 may be connected to the Internet via a firewall (not shown). The PC 105 may also be connected to the LAN 100. The MFP 101 performs communication using HTTP/HTTPS with respect to the web services provided by the matter management server 102. Also, the matter management server 102 may be configured as a cloud server that performs processing in cooperation with a plurality of servers.

Note that, although the MFP 101 is here assumed to be referred to as a document registration system, the MFP 101 and the Fax management server 104 may constitute the document registration system. Alternatively, the MFP 101, the Fax management server 104, and the matter management server 102 may constitute the document registration system.

<A Configuration of an Image Processing Apparatus>

The following will describe an example of a configuration of the MFP 101, which serves as an image processing apparatus, with reference to FIG. 2. A control unit 210 including a CPU 211 controls overall operation of the MFP 101. The CPU 211 perform various types of control, such as reading control and transmission control, by reading out control programs stored in a ROM 212 and executing the control programs. A RAM 213 is used as a main memory or a temporary storage apparatus such as a work area of the CPU 211. Note that, in the case of the MFP 101, one CPU 211 uses one memory (the RAM 213 or an HDD 214) to execute processing shown in the sequence diagrams that will be described later, but other aspects are also possible. For example, a plurality of CPUs and a plurality of RAMs or HDDs may be used in cooperation with each other to execute the processing shown in the sequence diagrams that will be described later. The HDD 214 stores image data and various types of programs.

An operation unit I/F 215 connects an operation unit 220 and the control unit 210. The operation unit 220 is provided with a liquid crystal display unit having a touch panel function, a keyboard, and the like. A printer I/F 216 connects a printer 221 and the control unit 210. Image data that is to be printed by the printer 221 is transferred thereto from the control unit 210 via the printer I/F 216, and is printed on a recording medium by the printer 221. A scanner I/F 217 connects a scanner 222 and the control unit 210. The scanner 222 reads an image on an original, generates image data (an image file), and inputs the generated image data in the control unit 210 via the scanner I/F 217. The MFP 101 can transmit the image data (image file) generated by the scanner 222 by facsimile or e-mail.

A modem I/F 218 connects a modem 223 and the control unit 210. The modem 223 connects the control unit 210 (MFP 101) to the PSTN 110. The modem 223 executes fax communication with a fax apparatus on the PSTN 110. A network I/F 219 connects the control unit 210 (MFP 101) to the LAN 100. Image data and various types of information are transmitted to external apparatuses on the LAN 100 (the fax management server 104, the PC 105, and the like on the Internet via the matter management server 102 or the firewall 103), and various types of information are received from external apparatuses on the LAN 100.

<A Configuration of a Matter Management Server>

The following will describe an example of a configuration of a matter management server 102 with reference to FIG. 3. A control unit 310 including a CPU 311 controls overall operation of the matter management server 102. The CPU 311 reads out control programs stored in a ROM 312, and executes various types of control processing. A RAM 313 is used as a main memory or a temporary storage apparatus such as a work area of the CPU 311. An HDD 314 stores image data and various types of programs. A network I/F 315 connects the control unit 310 (matter management server 102) to the LAN 100. The network I/F 315 transmits and receives various types of information to and from other apparatuses on the LAN 100.

<A Configuration of a Fax Management Server>

The following will describe an example of a configuration of the fax management server 104 with reference to FIG. 4. A control unit 410 including a CPU 411 controls overall operation of the fax management server 104. The CPU 411 reads out control programs stored in the ROM 412, and executes various types of control processing. A RAM 413 is used as a main memory or a temporary storage apparatus such as a work area of the CPU 411. An HDD 414 stores image data and various types of programs. A network I/F 415 connects the control unit 410 (Fax management server 104) to the LAN 100. The network I/F 415 transmits and receives various types of information to and from other apparatuses on the LAN 100.

<A Fax Reception Management List>

The following will describe a fax reception management list 500 that is stored in the HDD 414 of the fax management server 104 with reference to FIG. 5. When the MFP 101 receives document data by facsimile, communication processing is performed, and the document data is transferred to the fax management server 104. Thereafter, a new record is added to the fax reception management list 500 of document data, and information on the fax reception is managed. The fax reception management list 500 includes information on reception ID 501, storage location 502, reception date and time 503, sheet count 504, and transmission source number 505.

Reception ID 501 is information that uniquely indicates a fax reception. Storage location 502 is information that indicates a location where document data received by facsimile is stored and a document ID added to the document data at the storage location. In the case where the storage location 502 is "Server_0101", this indicates that the document data received by facsimile is stored in the fax management server 104 (in the HDD 414 thereof) and is managed with the document ID "0101". Here, although the location on the fax management server 104 is indicated as an example, the present invention is not limited to this, and the location may be a storage location on another apparatus, such as the MFP 101 or another apparatus on the network. Reception date and time 503 is information that indicates the date and time when the document data is received by facsimile. Sheet count 504 is information that indicates the number of documents received by facsimile. Transmission source number 505 is information that indicates the telephone number of a transmission source of the document data received by facsimile.

<A Matter Management List>

The following will describe a matter management list 600 that is stored in the HDD 314 of the matter management server 102 with reference to FIG. 6. Note that, although types of information included in the matter management list 600 are used as attribute information in the present embodiment and other embodiments that will be described later, information other than those types of information included in the matter management list 600 may of course be used as the attribute information. If an office in which the MFP 101 is installed has received a new matter order from a client, a new record is added to the matter management list 600, and information on the matter is managed. The matter management list 600 includes, as attribute information, information on matter ID 601, matter name 602, client name 603, telephone number 604, and person in charge 605.

Matter ID 601 is information that uniquely indicates matter data. Matter name 602 is information that indicates the name of a matter. Client name 603 is information that indicates the name of a client (company) who has ordered the matter. Telephone number 604 is information that indicates the telephone number of the client. Person in charge 605 is information that indicates who the person in charge of the matter is, among staff (users of the MFP 101) of the office.

<A Document Management List>

The following will describe document management lists 700 and 710 that are stored in the HDD 314 of the matter management server 102 with reference to FIG. 7. If an instruction to perform processing for associating document data with matter data is given, a new record is added to the document management list 700, and document data that was received by facsimile is associated with designated matter data. The document management lists 700 and 710 each include information on document ID 701, document name 702, and matter ID 703.

Document ID 701 is information that uniquely indicates a document. Document name 702 is information that indicates the name of the document. Matter ID 703 is information that uniquely indicates matter data with which the document data is associated, and corresponds to the matter ID 601 in the matter management list 600.

<An Operation Screen>

The following will describe examples of operation screens that are displayed on a display of the PC 105 with reference to FIGS. 8 and 9. A screen 800 of FIG. 8 is displayed by the web browser of the PC 105, based on HTML and JavaScript that are provided by the web server of the MFP 101.

The screen 800 shows a list of fax receptions managed in the fax reception management list 500. When a user selects any one fax reception and operates a delete button 801, the user can delete document data received by facsimile. Also, when the user operates an update button 802, the latest fax reception management list 500 is read and the screen 800 is updated to include the read information. Note that, in the screen 800, a link for displaying a screen 900 of FIG. 9 is embedded for each row, and thus the screen 800 can shift to the screen 900. Also, a configuration is also possible in which only records that relate to the operating user are extracted from the fax reception management list 500 based on the transmission source number 505 of the fax reception management list 500 and the person in charge 605 of the matter management list 600, and displayed on the screen 800.

The screen 900 is displayed by the web browser of the PC 105, based on HTML and JavaScript that are provided by the web server of the fax management server 104. Matter name 901 indicates the matter name 602 of the document that can be acquired from the obtained matter management list 600.

Document name 902 indicates the name of the document to be registered in the matter management server 102. The document name 902 is generated and displayed as a combination of the reception ID 501, the reception date and time 503, the transmission source number 505, and the like of the document data. For example, the document name 902 is displayed like "20121001123000_0311111111". Here, the document name 902 may also be generated as a combination of all of the reception ID 501, the reception date and time 503, and the transmission source number 505, or by a combination of only some designated components. Alternatively, information associated with the document other than those types of information indicated here may be combined. Also, the user can change the document name by inputting any character string using a keyboard (not shown).

A registration button 905 is operated to register the information input by the user via the screen 800 in the matter management server 102. A delete button 906 is operated to delete the document data received by facsimile without performing document registration. A print button 907 is operated to print the obtained fax document. In a region 903, the obtained fax document is preview-displayed. Operation keys 904 are used for switching the preview-displayed page of the document data.

<An Operation Sequence when Registration Processing is Performed>

The following will describe, with reference to FIG. 10, a processing sequence performed when a user registers matter data and a file name using the screens 800, 900 in the states in which the management lists are as shown in FIGS. 5 and 6, and as shown by the reference numeral 700 of FIG. 7. Operations that will be described later are realized by the CPU 211 of the MFP 101, the CPU 311 of the matter management server 102, and the CPU 411 of the fax management server 104 executing control programs stored in the HDD 214, the HDD 314, and the HDD 414 of the respective components.

A flow of procedures performed when the MFP 101 receives a fax document will first be described. In step S1001, the MFP 101 receives a fax document. Upon receipt of the fax document, the MFP 101 requests, in step S1002, the matter management server 102 for the matter management list 600, that is, attribute information on individual matters. In step S1003, the matter management server 102 responds to the MFP 101 with the requested matter management list 600. At that time, the matter management list 600 (attribute information) that is to be sent may include all matters held by the matter management server 102, or may be configured to include only associated matters that are extracted by using, for example, the transmission source number or the like of the fax document.

Next, in step S1004, the MFP 101 transmits, to the fax management server 104, the fax document received in step S1001, together with the matter management list 600 received from the matter management server 102 in step S1003. Upon receipt of the matter management list 600, the fax management server 104 stores the received matter management list 600 in the HDD 414. With the above-described procedural flow, the fax management server 104 thus obtains and holds the fax document received by the MFP 101 and the latest matter management list 600 at the time when the fax document is received.

Subsequently, a procedural flow in which a user browses a fax document using the PC 105, and registers the fax document in the matter management server 102 will be described. In step S1005, the web browser of the PC 105 requests the fax management server 104 to display a list of fax documents that have already been received. In step S1006, the fax management server 104 responds to the PC 105 with screen information on a screen of the list of fax documents received in step S1004. The PC 105 displays the screen of the list based on the screen information obtained by the web browser. In step S1007, the PC 105 designates a fax document that is to be registered in the matter management server 102 via the screen of the list of received fax documents that are being displayed on the web browser. In step S1008, the fax management server 104 responds to the PC 105 with screen information on a detailed screen (detailed information) of the fax document. At that time, the fax management server 104 is configured such that the matter name 602 in the matter management list 600 received in step S1004 is set as a matter candidate, and can be selected from the pull down menu of the matter name 901 in the detailed screen. In the PC 105, a matter name 901 to be registered is selected by an input of the user via the detailed screen displayed by the web browser based on the screen information, the document name is input, and then pressing of the registration button 905 is received. Upon receipt of the pressing, the PC 105 notifies, in step S1009, the fax management server 104 of a registration instruction.

Upon receipt of the notification in step S1009, the fax management server 104 transmits, in step S1010, a set of the designated fax document and the matter ID 601 (association information) derived from the selected matter name 602 to the MFP 101. Here, "association information" refers to information that indicates a matter that is associated with the fax document managed by the matter management server 102. Note that, although the matter ID is employed as an example of the association information, the present invention is not limited to this, and the association information may be any information that indicates a given matter with which the fax document to be registered is associated. The transmission may be performed using the connection that was made with WebSocket in step S1004 and is maintained. Also, the MFP 101 may perform polling with respect to the transmission processing of the fax management server 104. By employing any one of these methods, it is possible for the fax document and the matter ID 601 to be transmitted from the fax management server 104 to the MFP 101.

Next, in step S1011, the MFP 101 transmits the received fax document and matter ID 601 to the matter management server 102, and registers the document data in the document management list 700. With this, the selected fax document and the given matter data are registered in association with each other. Further, in step S1012, the MFP 101 notifies the fax management server 104 of completion of the registration. In response thereto, in step S1013, the fax management server 104 sends a registration completion screen to the PC 105.

As a result of the above-described procedures, the document management list 700 of FIG. 7 shifts to the document management list 710 of FIG. 7. Specifically, a new record of the document ID 303 is added to the document management list 700. The document name 702 of the record of the document ID 303 is the same as the document name 902 of FIG. 9, and the matter ID 703 of the record of the document ID 303 is the same as the matter ID 601 of the matter data selected from the matter names 901 of FIG. 9.

As described above, in the first embodiment, the MFP 101 automatically transfers, to the fax management server 104, the document data received by facsimile and the matter management list 600 obtained from the matter management server 102 at the time of the reception by facsimile. Also, the matter management list 600 that the fax management server 104 has received in advance from the MFP 101 is used when a user registers the received fax document and matter data in association with each other by accessing the fax management server 104 using the PC 105. The matter data to be associated with the fax document is designated, and the fax management server 104 that has received a registration instruction transmits the fax document and information on the matter data to the MFP 101. Thereafter, the MFP 101 transmits the fax document and the information on the matter data that were received from the fax management server 104 to the matter management server 102, and registers them in the matter management server 102. This thus allows obtainment of a matter candidate by the fax management server 104, and registration of the fax document for the matter in the matter management server 102 from the fax management server 104.

Second Embodiment

Hereinafter, a second embodiment of the present invention will be described with reference to FIG. 11. The present embodiment differs from the first embodiment in a timing at which the MFP 101 receives the matter management list 600 (attribute information) from the matter management server 102. Specifically, the MFP 101 obtains the matter management list 600 each time the PC 105 requests the fax management server 104 to display the fax document in detail. Operations that will be described later are realized by the CPU 211 of the MFP 101, the CPU 311 of the matter management server 102, and the CPU 411 of the fax management server 104 executing control programs stored in the HDD 214, the HDD 314, and the HDD 414 of the respective components.

In comparison to the sequence of FIG. 10, the sequence of FIG. 11 lacks the operations of steps S1002 and S1003, and in step S1002, the MFP 101 transmits only the fax document to the fax management server 104. Then, processing for requesting the MFP 101 for a matter management list that is performed by the fax management server 104 is newly added. Similarly to the first embodiment, the requesting processing may be performed using the connection that was made with WebSocket in step S1102 and is maintained. Also, the MFP 101 may perform polling with respect to the transmission processing of the fax management server 104.

Specifically, in step S1105, the PC 105 requests the fax management server 104 for detailed display (detailed information) of the document data selected by an input of the user. Subsequently, in step S1106, the fax management server 104 requests the MFP 101 for a matter management list, and in step S1107, the MFP 101 requests the matter management server 102 for the matter management list. In step S1108, the matter management server 102 responds to the MFP 101 with the matter management list. In step S1109, the MFP 101 transmits the matter management list to the fax management server 104. Then, in step S1110, the fax management server 104 responds to the PC 105 with information on a detailed screen. Note that the processing from step S1111 to step S1115 are the same as those in step S1009 to step S1013 of FIG. 10, and thus descriptions thereof are omitted. Accordingly, when the PC 105 requests the fax management server 104 to display the fax document in detail, the latest matter management list 600 at the time of the request can be obtained and displayed.

Third Embodiment

Hereinafter, a third embodiment of the present invention will be described with reference to FIG. 12. In the present embodiment, the fax management server 104 directly obtains the matter management list 600 (attribute information) from the matter management server 102. Operations (sequence) that will be described later are realized by the CPU 311 of the matter management server 102 and the CPU 411 of the fax management server 104 executing control programs stored in the HDD 314 and the HDD 414 of the respective servers.

In FIG. 12, although the MFP 101 is not shown, a fax document is assumed to appropriately be transmitted to the fax management server 104 when the MFP 101 receives the fax document (as with steps S1101 and S1102 of FIG. 11). In comparison to the sequence of FIG. 10, it is clear from the sequence of FIG. 12 that the MFP 101 does not intermediate the communication between the fax management server 104 and the matter management server 102 but direct communication between the fax management server 104 and the matter management server 102 is performed.

First, a procedural flow in which the matter management server 102 transmits a matter management list 600 to the fax management server 104 will be described. In step S1201, the matter management server 102 receives an addition of matter information. In response thereto, in step S1202, the matter management server 102 transmits, to the fax management server 104, the latest matter management list 600 in which a matter is added. The matter management list 600 is stored in the HDD 414 of the fax management server 104. With the above-described procedures, the fax management server 104 obtains and holds the latest matter management list 600 at the time of the reception.

Subsequently, a procedural flow in which a user browses a fax document using the PC 105, and registers the fax document in the matter management server 102 will be described. Processing in steps S1203 to S1207 are the same as that in steps S1005 to S1009 of FIG. 10, and thus description thereof are omitted. Then, in step S1208, the fax management server 104 transmits, to the matter management server 102, a set of the designated fax document and a matter ID 601 derived from the selected matter name 602. The transmission may be performed by employing the same system as in step S1010 and using connection that was made with WebSocket in step S1202 and is maintained. Also, the matter management server 102 may perform polling with respect to transmission processing of the fax management server 104.

By employing any one of the methods, it is possible for the fax document and the matter ID 601 (association information) to be transmitted from the fax management server 104 to the matter management server 102. Then, in step S1209, the matter management server 102 notifies the fax management server 104 of completion of registration. Subsequently, in step S1210, the fax management server 104 responds to the PC 105 with a registration completion screen. As a result of the above-described procedures, the document management list 700 of FIG. 7 shifts to the document management list 710. The content of the shift is similar to that in the first embodiment.

As described above, according to the present embodiment, the fax management server 104 directly receives the matter management list 600 from the matter management server 102. Also, an matter to be associated with the fax document is designated, the fax management server 104 that has received a registration instruction directly transmits the fax document and information on the matter to the matter management server 102, and the matter management server 102 performs registration processing based on the received fax document and information on the matter (association information). This thus allows displaying the matter candidate on the fax management server 104 without MFP 101, and registration of the matter in the matter management server 102 from the fax management server 104. Therefore, also in the present embodiment, similar to the first embodiment, a selected fax document and a given matter are registered in association with each other.

Also, in the present embodiment, similar to the second embodiment, the timing to obtain the matter management list 600 may be a timing at which the PC 105 requests the fax management server 104 to display document data in detail. Specifically, the processing is such that, after step S1205, the fax management server 104 requests the matter management server 102 for the matter management list 600, and the matter management server 102 transmits the matter management list 600 to the fax management server 104.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-283668 filed on Dec. 26, 2012, which is hereby incorporated by reference herein in its entirety.

What is claimed is:

1. An image processing system comprising an image processing apparatus, a document management server for managing document data received from the image processing apparatus, and a matter management server for managing the document data and a matter in association with each other,
the image processing apparatus comprising:
a reception unit configured to receive document data;
an obtainment unit configured to obtain a list of items of attribute information for respectively indicating items on matters from the matter management server; and
a transmission unit configured to transmit, to the document management server, the document data received by the reception unit and the list of items of attribute information obtained by the obtainment unit,
the document management server comprising:
a presenting unit configured to present, in accordance with a request from an external apparatus, the document data and the list of items of attribute information transmitted by the transmission unit of the image processing apparatus, to the external apparatus; and
a registration unit configured to receive, from the external apparatus, association information for associating the document data with the matter data that is selected by the external apparatus based on the document data and the list of items of attribute information presented by the presenting unit and associates the document data with the matter data, and to register, together with the association information, the document data in the matter management server via the image processing apparatus.

2. The image processing system according to claim 1, wherein the obtainment unit is configured to obtain the list of items of attribute information from the matter management server at a timing at which the document data is received by the reception unit.

3. The image processing system according to claim 1, wherein the obtainment unit is configured to obtain the list of items of attribute information from the matter management server at a timing at which detailed information on the document data is requested by the document management server in accordance with a request from the external apparatus.

4. The image processing system according to claim 1, wherein the presenting unit is configured to transmit, in accordance with a request from the external apparatus, screen information indicating a list of items of managed document data to the external apparatus, and to transmit, when document data is selected via a screen corresponding to the screen information, screen information indicating attribute information on the selected document data to the external apparatus.

5. An image processing system comprising an image processing apparatus, a document management server for managing document data received by the image processing apparatus, and a matter management server for managing the document data and matter data in association with each other,
the image processing apparatus comprising:
a reception unit configured to receive document data; and
a transmission unit configured to transmit the document data received by the reception unit to the document management server,
the document management server comprising:
an obtainment unit configured to obtain a list of items of attribute information for respectively indicating items of matter data from the matter management server;
a presenting unit configured to present, in accordance with a request from an external apparatus, the document data transmitted by the transmission unit of the image processing apparatus and the list of items of attribute information obtained by the obtainment unit, to the external apparatus; and
a registration unit configured to receive, from the external apparatus, association information for associating the document data with the matter data that is selected by the external apparatus based on document data and the list of items of attribute information presented by the presenting unit and associates the document data with the matter data, and to register, together with the association information, the document data in the matter management server.

6. An image processing apparatus capable of communicating with a document management server for managing document data, and with a matter management server for managing the document data and matter data in association with each other, the image processing apparatus comprising:
a reception unit configured to receive document data;
an obtainment unit configured to obtain a list of items of attribute information for respectively indicating items of matter data from the matter management server; and
a transmission unit configured to transmit the document data received by the reception unit and the list of items of attribute information obtained by the obtainment unit to the document management server,
wherein, in accordance with an input of a user from an external apparatus, the document data and the attribute information are associated with each other in the document management server, and are registered in the matter management server.

7. A document management server being capable of communicating with an image processing apparatus for receiving document data, and with a matter management server for managing the document data and matter data in association with each other, the document management server comprising:
   a presenting unit configured to present, in accordance with a request from an external apparatus, the document data and a list of items of attribute information for respectively indicating items of matter data transmitted from the image processing apparatus, to the external apparatus; and
   a registration unit configured to receive, from the external apparatus, association information for associating the document data with the matter data that is selected by the external apparatus based on the document data and the list of items of attribute information presented by the presenting unit and associates the document data with matter data, and to register, together with the association information, the document data in the matter management server via the image processing apparatus.

8. A document management server being capable of communicating with an image processing apparatus for receiving document data, and with a matter management server for managing the document data and matter data in association with each other, the document management server comprising:
   an obtainment unit configured to obtain a list of items of attribute information for indicating items of matter data from the matter management server;
   a presenting unit configured to present, in accordance with a request from an external apparatus, the document data transmitted from the image processing apparatus and the list of items of attribute information obtained by the obtainment, to the external apparatus; and
   a registration unit configured to receive, from the external apparatus, association information for associating the document data with the matter data that is selected by the external apparatus based on the document data and the list of items of attribute information presented by the presenting unit and associates the document data with matter data, and to register, together with the association information, the document data in the matter management server.

9. A control method of an image processing system comprising an image processing apparatus, a document management server for managing document data received by the image processing apparatus, and an matter management server for managing the document data and matter data in association with each other, the method comprising:
   in the image processing apparatus,
   receiving document data;
   obtaining a list of items of attribute information for respectively indicating items of matter data from the matter management server; and
   transmitting, to the document management server, the document data received in the receiving step, and the list of items of attribute information obtained in the obtaining step, and
   in the document management server,
   presenting, in accordance with a request from an external apparatus, the document data and the list of items of attribute information transmitted in the transmitting step by the image processing apparatus, to the external apparatus; and
   receiving, from the external apparatus, association information for associating the document data with the matter data that is selected by the external apparatus based on the document data and the list of items of attribute information presented in the presenting step and associates the document data with the matter data, and registering, together with the association information, the document data in the matter management server via the image processing apparatus.

10. A control method of an image processing system comprising an image processing apparatus, a document management server for managing document data received by the image processing apparatus, and a matter management server for managing the document data and matter data in association with each other, the method comprising:
   in the image processing apparatus,
   receiving document data; and
   transmitting, to the document management server, the document data received in the receiving step, and
   in the document management server,
   obtaining a list of items of attribute information for respectively indicating items of matter data from the matter management server;
   presenting, in accordance with a request from an external apparatus, the document data transmitted in the transmitting step by the image processing apparatus, and the list of items of attribute information obtained in the obtaining step, to the external apparatus; and
   receiving, from the external apparatus, association information for associating the document data with the matter data that is selected by the external apparatus based on the document data and the list of items of attribute information presented in the presenting step and associates the document data with the matter data, and registering, together with the association information, the document data in the matter management server.

11. A control method of an image processing apparatus being capable of communicating with a document management server for managing document data, and with a matter management server for managing the document data and matter data in association with each other, the method comprising:
   receiving document data;
   obtaining a list of items of attribute information for respectively indicating items of matter data from the matter management server; and
   transmitting, to the document management server, the document data received in the receiving step, and the list of items of attribute information obtained in the obtaining step,
   wherein, in accordance with an input of a user from an external apparatus, the document data and the attribute information are associated with each other in the document management server, and are registered in the matter management server.

12. A control method of a document management server being capable of communicating with an image processing apparatus for receiving document data, and with a matter management server for managing the document data and matter data in association with each other, the method comprising:
   presenting, in accordance with a request from an external apparatus, the document data and a list of items of attribute information for respectively indicating items of matter data transmitted from the image processing apparatus, to the external apparatus; and
   receiving, from the external apparatus, association information for associating the document data with the matter data that is selected by the external apparatus based on the document data and the list of items of attribute information presented in the presenting step and associates the document data with matter data, and registering, together with the association information, the document data in the matter management server via the image processing apparatus.

13. A control method of a document management server being capable of communicating with an image processing apparatus for receiving document data, and with a matter management server for managing that manages the document data and matter data in association with each other, the method comprising:
    obtaining a list of items of attribute information from the matter management server;
    presenting, in accordance with a request from an external apparatus, the document data transmitted from the image processing apparatus and the list of items of attribute information obtained in the obtaining step, to the external apparatus; and
    receiving, from the external apparatus, association information for associating the document data with the matter data that is selected by the external apparatus based on the document data and the list of items of attribute information presented in the presenting step and associates the document data with matter data, and registering, together with the association information, the document data in the matter management server.

14. A non-transitory computer-readable storage medium storing a computer program for causing a computer to execute the steps of the control method of an image processing system according to claim 9.

15. A non-transitory computer-readable storage medium storing a computer program for causing a computer to execute the steps of the control method of an image processing system according to claim 10.

16. A non-transitory computer-readable storage medium storing a computer program for causing a computer to execute the steps of the control method of an image processing apparatus according to claim 11.

17. A non-transitory computer-readable storage medium storing a computer program for causing a computer to execute the steps of the control method of a document management server according to claim 12.

18. A non-transitory computer-readable storage medium storing a computer program for causing a computer to execute the steps of the control method of a document management server according to claim 13.

* * * * *